United States Patent
Yuan et al.

(10) Patent No.: US 12,468,677 B2
(45) Date of Patent: Nov. 11, 2025

(54) IDENTIFYING AND CORRECTING MODEL FOCUS DRIFT DURING MODEL TRAINING

(71) Applicant: INTERNATIONAL BUSINESS MACHINES CORPORATION, Armonk, NY (US)

(72) Inventors: Zhong Fang Yuan, Xi'an (CN); Si Tong Zhao, Beijing (CN); Tong Liu, Xi'an (CN); Ya Juan Dang, Beijing (CN); Teng Jiao Li, BeiJing (CN); Tian Ji Yang, Beijing (CN); Wen Jie Hao, Xi'an (CN); Xiao Lin Sun, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 18/058,578

(22) Filed: Nov. 23, 2022

(65) Prior Publication Data
US 2024/0168931 A1  May 23, 2024

(51) Int. Cl.
*G06F 16/21* (2019.01)
*G06F 16/28* (2019.01)

(52) U.S. Cl.
CPC .......... *G06F 16/217* (2019.01); *G06F 16/285* (2019.01)

(58) Field of Classification Search
CPC .............................. G06F 16/217; G06F 16/285
See application file for complete search history.

(56) References Cited

U.S. PATENT DOCUMENTS

2017/0185896 A1    6/2017  Modha
2020/0012900 A1*   1/2020  Walters ............... G06F 16/2237
(Continued)

FOREIGN PATENT DOCUMENTS

WO    2016170368 A1    10/2016
WO    2019002603 A1    1/2019

OTHER PUBLICATIONS

T. He, et al., "Analyzing the Forgetting Problem in Pretrain-Finetuning of Open-domain Dialogue Response Models", Association for Computational Linguistics, Proceedings of the 16th Conference of the European Chapter of the Association for Computational Linguistics, Apr. 19-23, 2021, pp. 1121-1133.
(Continued)

*Primary Examiner* — Van H Oberly
*Assistant Examiner* — Samuel C Sharpless, III
(74) *Attorney, Agent, or Firm* — Konrad, Raynes, Davda & Victor, LLP; Janaki K. Davda

(57) ABSTRACT

Provided are techniques for identifying and correcting model focus drift during model training. A model is trained using an original dataset with data, and the is classified into clusters. A representation is assigned to each of the clusters. A first visualization dashboard with visualizations is generated, where each visualization represents a first data distribution of an associated cluster using the representation assigned to that cluster. The model is fine-tuned using a fine-tune dataset. A second visualization dashboard is generated by updating each visualization, where each visualization represents a second data distribution of the associated cluster. It is determined that a cluster of the clusters has focus drift based on changes between the first data distribution and the second data distribution. The focus drift is corrected by: adding the data of the cluster to the fine-tune
(Continued)

dataset to form a combined dataset and fine-tuning the model using the combined dataset.

20 Claims, 15 Drawing Sheets

(56) References Cited

U.S. PATENT DOCUMENTS

| | | | |
|---|---|---|---|
| 2023/0025677 A1* | 1/2023 | Sallee | G06F 3/0484 |
| 2023/0065870 A1* | 3/2023 | Pyzow | G06N 3/10 |
| 2023/0104757 A1* | 4/2023 | Pramod | G06N 3/084 |
| | | | 706/11 |
| 2023/0316710 A1* | 10/2023 | Mopur | G06V 10/762 |

OTHER PUBLICATIONS

Z. Chen et al., "Continual Learning and Catastrophic Forgetting", In "Lifelong Machine Learning", Morgan & Claypool Publishers, 2018, 21 pp.

J. Gama, "Learning with Drift Detection", ResearchGate, Conference Paper in Intelligent Data Analysis—Sep. 2004, 11 pp.

M. Jagielski et al., "Measuring Forgetting of Memorized Training Examples", arxiv, arXiv:2207.00099v1, Jun. 30, 2022, 19 pp.

S. Ndiritu, "Model Monitoring and Detecting drifts in ML Models using Deepchecks", Section, Engineering Education (EngEd) Program, May 30, 2022, 28 pp.

A. Kutalev, "Natural Way to Overcome the Catastrophic Forgetting in Neural Networks", arxiv, arXiv:2005.07107v2, Jun. 4, 2021, 10 pp.

"System and Method for Detecting and Explaining Drift in Streaming Unstructured Data", IP.com, IP.com No. IPCOM000270723D, Aug. 2, 2022, 4 pp.

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

\* cited by examiner

IDENTIFYING AND CORRECTING MODEL FOCUS DRIFT DURING MODEL TRAINING

BACKGROUND

Embodiments of the invention relate to identifying and correcting model focus drift during model training. In addition, embodiments of the invention relate to warning of the model forgetting or model focus drift in an understandable and visual way during model training and correcting the model.

In the commercial scenario of deep learning, a class of problems often arises during model training. The entire training cycle of a model may involve generating many versions of the model. The first version of the model is often trained as the initial model using the largest batch of datasets during the first training of the model. For each of the subsequent versions of the model, a smaller number of datasets are used to fine-tune the previous model. For example, the model trained from iteration 1 is modified by iteration 2, and the model trained by iteration 2 is fine-tuned by iteration 3, etc.

However, with this process, the focus of the model may drift during fine-tuning (i.e., while creating the subsequent versions of the model), and the fit of the old dataset becomes poor, while the new dataset is better fitted, thus causing the model to have poor results on the old dataset.

To solve the problem of drift, conventional systems mix the new data with the old data and then train a model from scratch with all of this data. When the amount of old data is large, mixing the old data and the new data will result in retraining of the model taking a long time.

SUMMARY

In accordance with certain embodiments, a computer-implemented method comprising operations is provided for identifying and correcting model focus drift during model training. In such embodiments, a model is trained using an original dataset with data. The data of the original dataset is classified into clusters. A representation is assigned to each of the clusters. A first visualization dashboard with visualizations is generated, where a visualization of the visualizations is associated with a cluster of the clusters, and where each visualization represents a first data distribution of the associated cluster using the representation assigned to that cluster. The model is fine-tuned using a fine-tune dataset. A second visualization dashboard is generated by updating each visualization, where each visualization represents a second data distribution of the associated cluster. It is determined that a cluster of the clusters has focus drift based on changes between the first data distribution and the second data distribution. The focus drift is corrected by: adding the data of the cluster to the fine-tune dataset to form a combined dataset and fine-tuning the model using the combined dataset.

In accordance with other embodiments, a computer program product is provided for identifying and correcting model focus drift during model training. The computer program product comprises a computer readable storage medium having program code embodied therewith, the program code executable by at least one processor to perform operations. In such embodiments, a model is trained using an original dataset with data. The data of the original dataset is classified into clusters. A representation is assigned to each of the clusters. A first visualization dashboard with visualizations is generated, where a visualization of the visualizations is associated with a cluster of the clusters, and where each visualization represents a first data distribution of the associated cluster using the representation assigned to that cluster. The model is fine-tuned using a fine-tune dataset. A second visualization dashboard is generated by updating each visualization, where each visualization represents a second data distribution of the associated cluster. It is determined that a cluster of the clusters has focus drift based on changes between the first data distribution and the second data distribution. The focus drift is corrected by: adding the data of the cluster to the fine-tune dataset to form a combined dataset and fine-tuning the model using the combined dataset.

In accordance with yet other embodiments, a computer system is provided for identifying and correcting model focus drift during model training. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In such embodiments, a model is trained using an original dataset with data. The data of the original dataset is classified into clusters. A representation is assigned to each of the clusters. A first visualization dashboard with visualizations is generated, where a visualization of the visualizations is associated with a cluster of the clusters, and where each visualization represents a first data distribution of the associated cluster using the representation assigned to that cluster. The model is fine-tuned using a fine-tune dataset. A second visualization dashboard is generated by updating each visualization, where each visualization represents a second data distribution of the associated cluster. It is determined that a cluster of the clusters has focus drift based on changes between the first data distribution and the second data distribution. The focus drift is corrected by: adding the data of the cluster to the fine-tune dataset to form a combined dataset and fine-tuning the model using the combined dataset.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
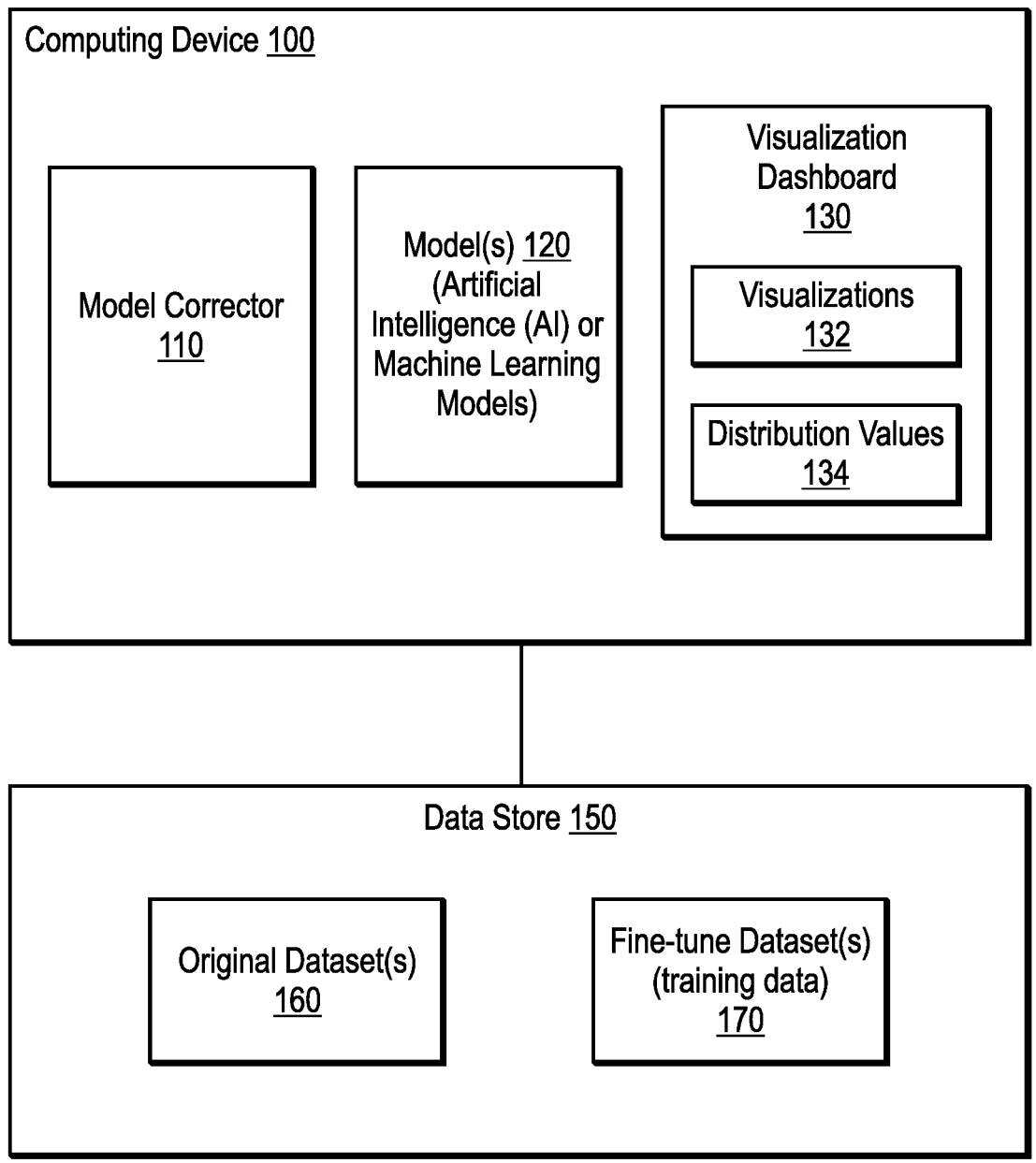
FIG. 1 illustrates, in a block diagram, a computing environment in accordance with certain embodiments.

FIG. 1 illustrates, in a block diagram, a computing environment in accordance with certain embodiments. A computing device 100 includes a model corrector 110, one or more models 120 (i.e., Artificial Intelligence (AI) or Machine Learning (ML) models), and a visualization dashboard 130. The visualization dashboard 130 includes visualizations 132 and distribution values 134.

The computing device 100 is connected to a data store 150. The data store 150 stores one or more original datasets 160 and one or more fine-tune datasets 170. An original dataset 160 is used to initially train a model, while each fine-tune dataset 170 is used to further train the model.

The model corrector 110 identifies model focus drift (also referred as "model forgetting") during training of the model 120 and corrects the model 120. In addition, the model corrector 110 provides warnings of the model focus drift in an understandable and visual way during training of the model 120.

The model corrector 110 detects model focus drift in a timely manner. Unlike conventional systems, the model corrector 110 detects model focus drift before there is a significant drop in active testing performance or online performance. This avoids the model 120 providing poor results and avoids applying a remedy after-the-fact.

Figure 2:
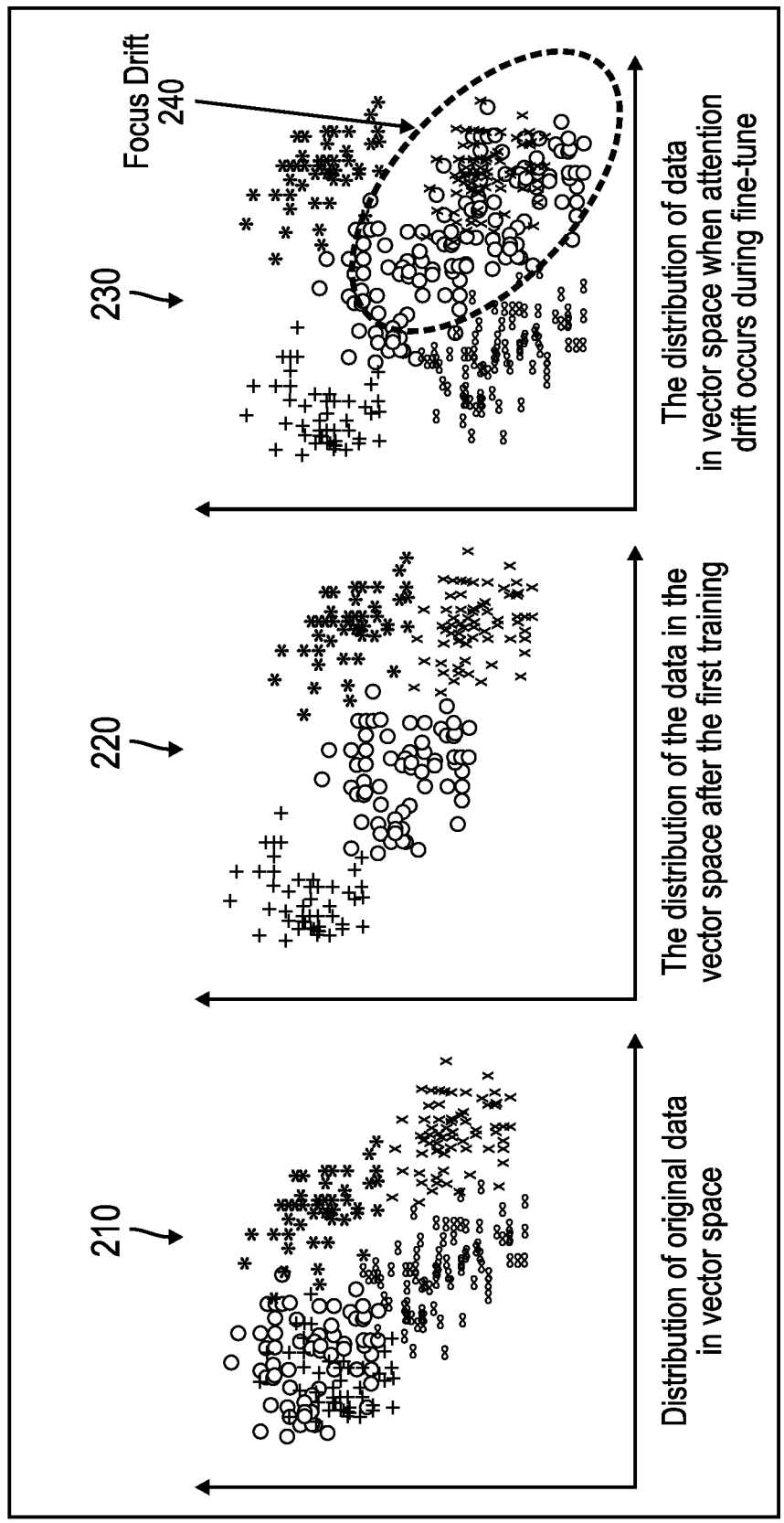
FIG. 2 illustrates an example of model focus drift in accordance with certain embodiments.

FIG. 2 illustrates an example of model focus drift in accordance with certain embodiments. In FIG. 2, graph 210 illustrates a distribution of original ("raw") data in a vector space. This model corrector 110 uses the original data to train a model. In this example, the original data is illustrated with 5 representations (i.e., symbols). In certain embodiments, each representation may be described as a type of data, so graph 210 illustrates 5 types of data. In certain embodiments, the representations may be colors instead of symbols. For example, a first type of data is represented by an open circle symbol ("o") but alternatively may be represented by a color, such as yellow; a second type of data may be represented by a plus symbol ("+") but alternately may be represented by a color, such as purple, a third type of data may be represented by an "x" symbol but alternately may be represented by a color, such as green; a fourth type of data may be represented by an asterisk symbol ("*") or but alternately may be represented by a color, such as blue; and a fifth type of data may be represented by an infinity symbol ("o") but alternately may be represented by a color, such as lilac.

Graph 220 illustrates the distribution of the original data in the vector space after a first iteration of training of the model. In this example, the first iteration of training uses four types of data of the original dataset, and so the graph 220 shows four clusters of data using representations "o", "+", "*", and "*".

Graph 230 illustrates the distribution of the original data in the vector space when focus drift 240 occurs during fine-tuning of the model. During fine-tuning of the model, new ("raw") data represented by "∞" is used to train the model. However, as shown in graph 230, training the model with the new data resulted in focus drift 240. In the area of the focus drift 240, raw data from two clusters are mixed. Raw data may be described as the feature vectors of the training data for the initial model.

There may be any number of iterations of training (with the initial training and fine-tuning) the model. The term "iteration" may also be referred to as "epoch".

Figure 3:
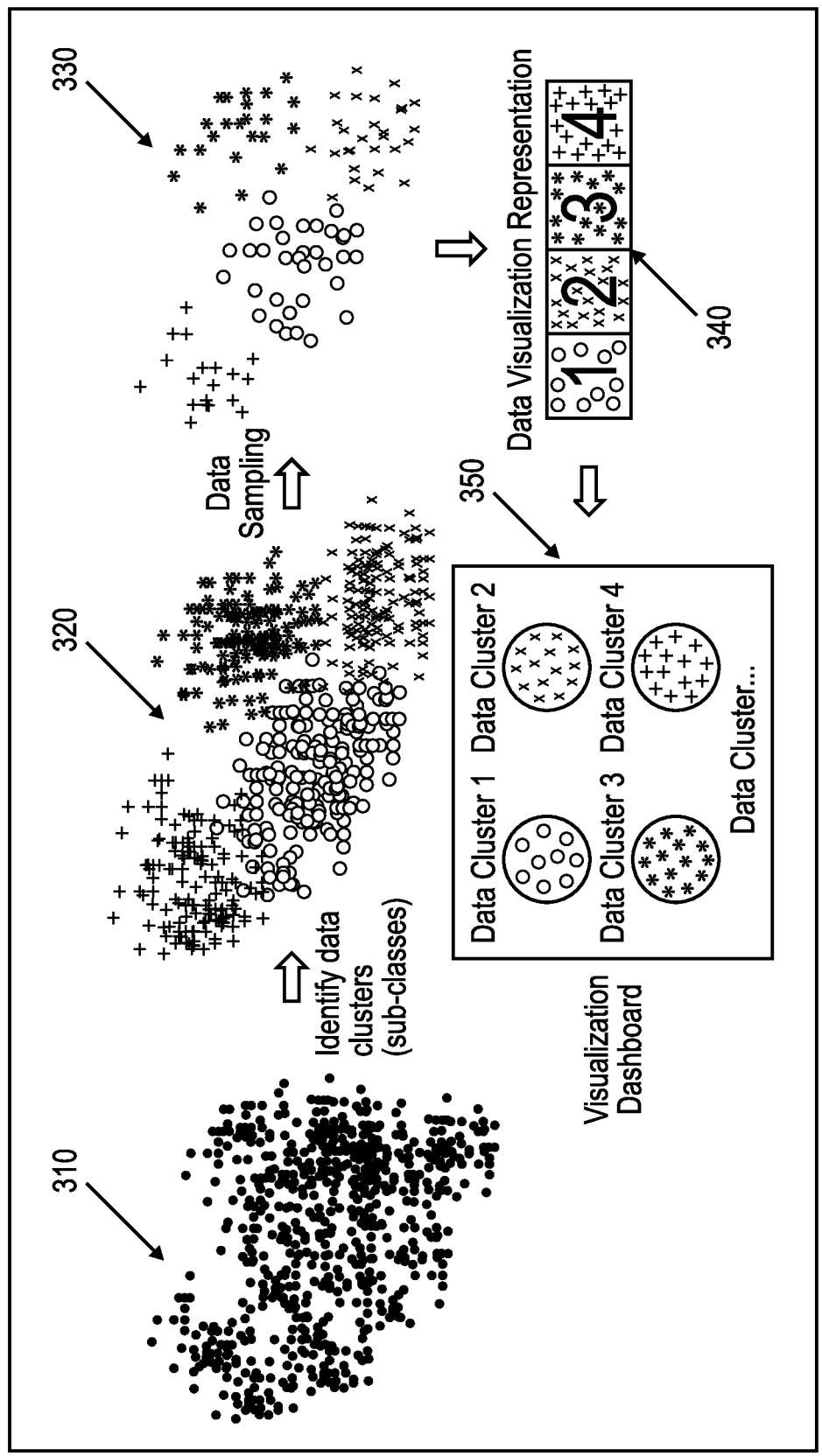
FIG. 3 illustrates model visualization in accordance with certain embodiments.

FIG. 3 illustrates model visualization in accordance with certain embodiments. The model corrector 110 provides model visualization, which dynamically and visually shows the fit of the fine-tuned model to an original dataset of features during each fine-tune iteration to determine whether there is focus drift. If there is focus drift after a fine-tune iteration, the model corrector 110 identifies which part of the original dataset has been affected by the focus drift, and then the model corrector 110 mixes the affected part of the original dataset with the fine-tune dataset of features to generate a combined dataset and fine-tunes the model again using this combined dataset. This is to correct the focus drift and to ensure that the model does not "forget" the original dataset while learning the new features in the iteration dataset.

In FIG. 3, initially, the model corrector 110 classifies (i.e., "data clusters" or "separates") the original dataset 310 into data clusters 320 (i.e., "sub-classes") based on common features. Then, the model corrector 110 samples the data for each data cluster to generate sampled data cluster data 330. For each sampled data cluster data 330, the model corrector 110 assigns a representation. With embodiments, the representation may be a color, a symbol, etc. With embodiments, the representation may be randomly selected, pre-determined (e.g., with a mapping that a cluster with certain features has a certain representation, etc.).

The model corrector 110 generates and displays the data visualization representation 340 that identifies the representation used for each data cluster. Then, the model corrector 140 generates and displays a visualization dashboard with visualization 350, which indicates whether the data distribution of a data cluster has changed. In this manner, the visualization dashboard provides an alert that focus drift has occurred.

In certain embodiments, the visualization dashboard displays a visualization for each iteration of training a model, from the first iteration using original data through each additional iteration of fine-tuning the model using fine-tune data.

In certain embodiments, the visualization 350 includes a circle for each data cluster, and the circle includes the representation for that data cluster. If the data distribution for the data cluster has changed, then the representation for that data cluster is modified (e.g., the color is changed or color is added to a symbol, etc.). In certain embodiments, each circle is associated with a distribution value that represents the data distribution of the data represented with that circle.

Figure 4:
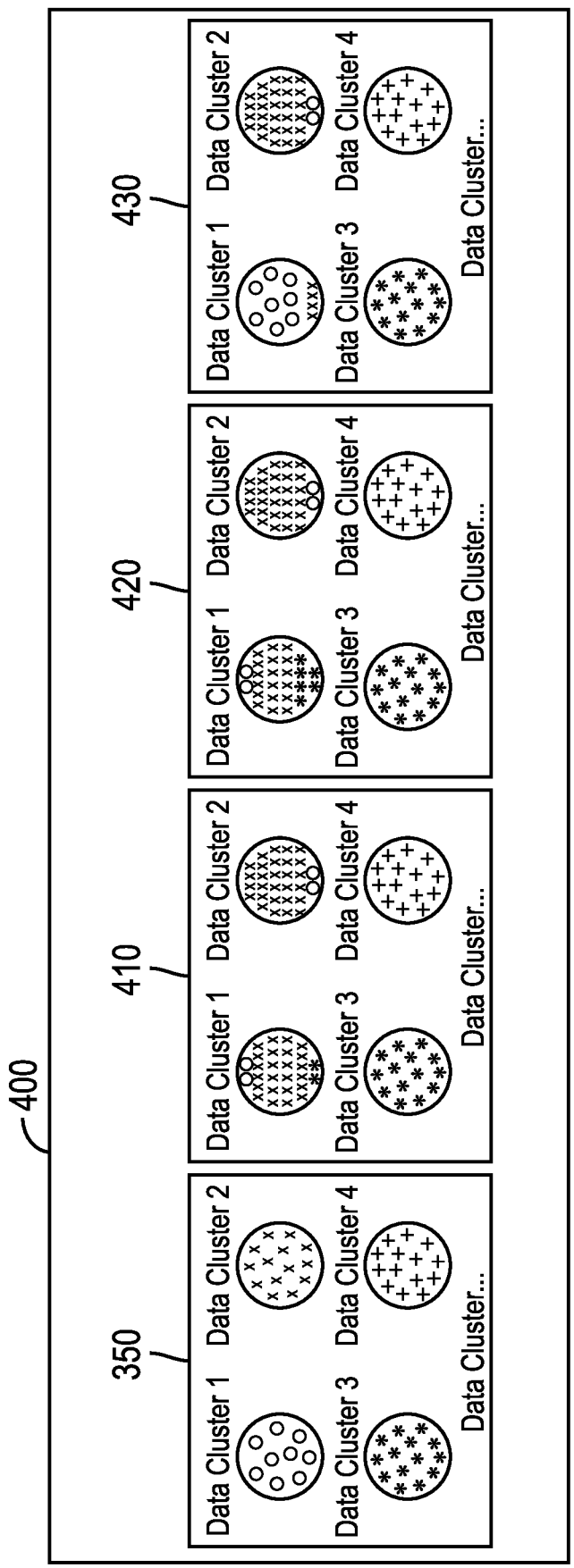
FIG. 4 illustrates an example visualization dashboard in accordance with certain embodiments.

FIG. 4 illustrates example visualization dashboard 400 in accordance with certain embodiments. In FIG. 4, before starting fine-tuning of the model (and after the first iteration of training the model with the original dataset), the visualization dashboard 400 includes visualization 350, which indicates that each data cluster includes representations for that data cluster and the distinction between data clusters is clear. After a second iteration (with the model being fine-tuned using a fine-tune datasets), the visualization dashboard 400 includes visualization 410, which indicates that focus drift has occurred for data cluster 1 and data cluster 2. The model corrector 110 also determines that the amount of focus drift (with reference to the visualization 350) does not exceed a threshold (i.e., a warning value has not been reached that would trigger correction of the focus drift). In this example, in visualization 410, data cluster 1 includes representations of three subclasses of data (with representations "o", "x", and "*"), while data cluster 2 includes representations of two subclasses of data (with "x" and "o").

After a third iteration (with the model being fine-tuned using one or more corresponding fine-tune datasets), the visualization dashboard 400 includes visualization 420, which indicates that further focus drift has occurred for data cluster 1. The model corrector 110 determines that the focus drift for data cluster 1 (with reference to visualization 350) has exceeded the threshold, and the model corrector 110 initiates model correction. To perform model correction, the model corrector 110 mixes the data from the original dataset for data cluster 1 with the data from the fine-tune dataset in the preceding iteration to generate a combined dataset. In this example, the data distribution of cluster 2 has not changed further (and does not exceed the threshold), and so the change in the data distribution does not trigger model correction.

In the next and fourth iteration, the model corrector 110 fine-tunes the model using the combined dataset, and the visualization dashboard 400 includes visualization 430. After the fine-tuning to correct the model drift, the visualization 430 indicates that the data cluster 1 is now clear again and there is clear distinction between the data clusters (i.e., the data distribution of data cluster 1 has similar to the data distribution of data cluster 1 in visualization 350).

With embodiments, the number of visualizations displayed in the visualization dashboard may be modified. In certain embodiments, the visualization dashboard displays the visualization 350 after the first iteration (using original data) for comparison to a visualization (such as 410 or 420) after a particular fine-tune iteration.

As illustrated in FIG. 4, the data distribution of one or more clusters may change with iterations of fine-tuning the model. In FIG. 4, the data distributions of data cluster 3 and data cluster 4 do not change with the iterations of fine-tuning the model.

Figure 5:
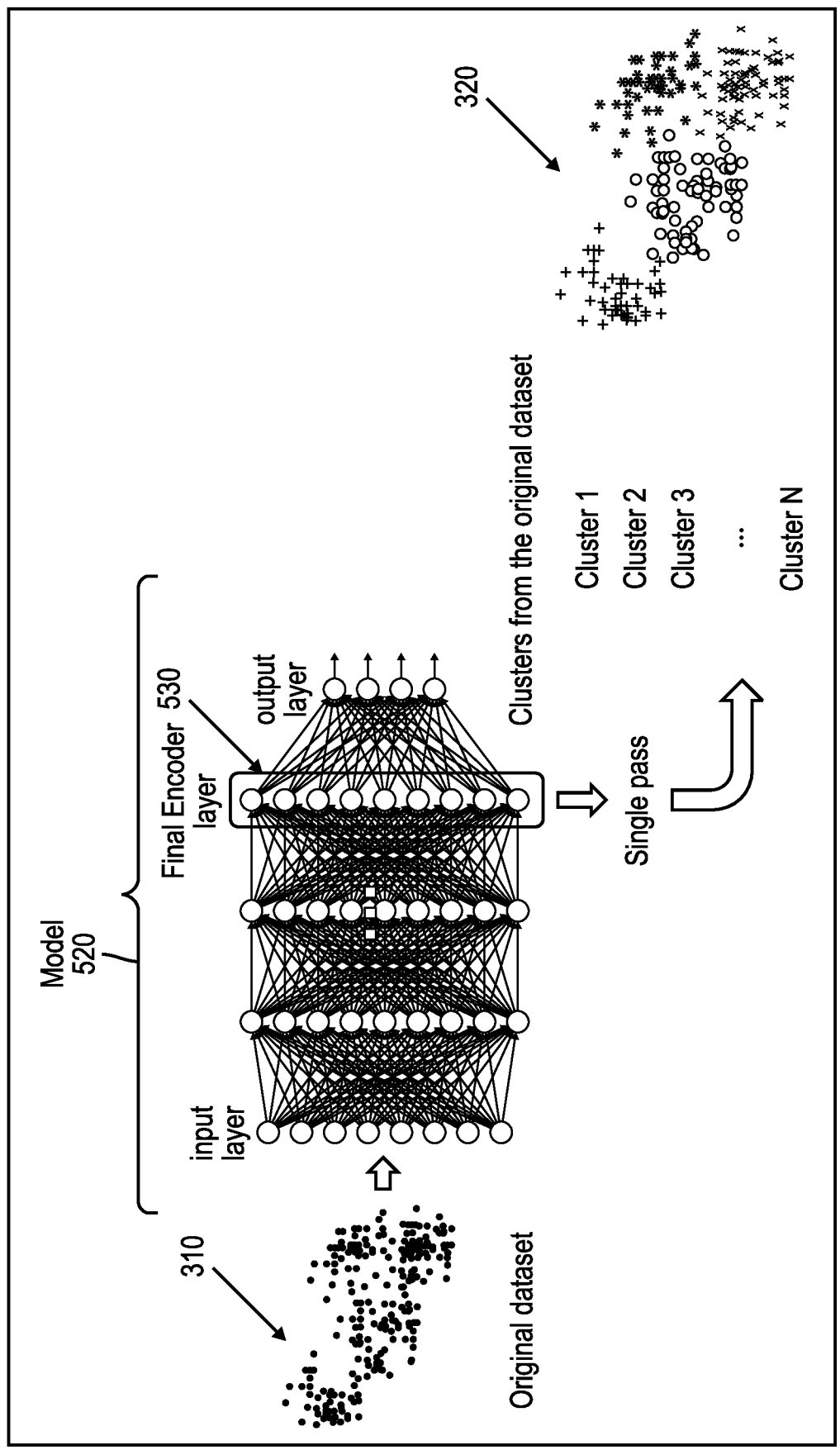
FIG. 5 illustrates clustering in accordance with certain embodiments.

FIG. 5 illustrates clustering in accordance with certain embodiments. With embodiments, the model corrector 110 uses a clustering technique that is a single-pass technique and that does not require a predefined number of clusters. The model corrector 110 uses the original data 310 and the model 520 for clustering. In certain embodiments, the model 520 includes an input layer, and output layer, and hidden layers in between the input layer and the output layer, where the three small squares represent ellipses and indicate that there may be any number of hidden layers. With embodiments, the data used for the clustering is a vector generated from the original dataset 310 through the final encoder layer 530 of the model 320. In certain embodiments, the final encoder layer is derived from the original model 240 by removing the softmax or sigmod layer (i.e., the representational vector). After the single-pass clustering technique, the model corrector 110 divides the original dataset into N data clusters 320, which may be described as the data distribution of the original data from the original dataset 310.

Figure 6:
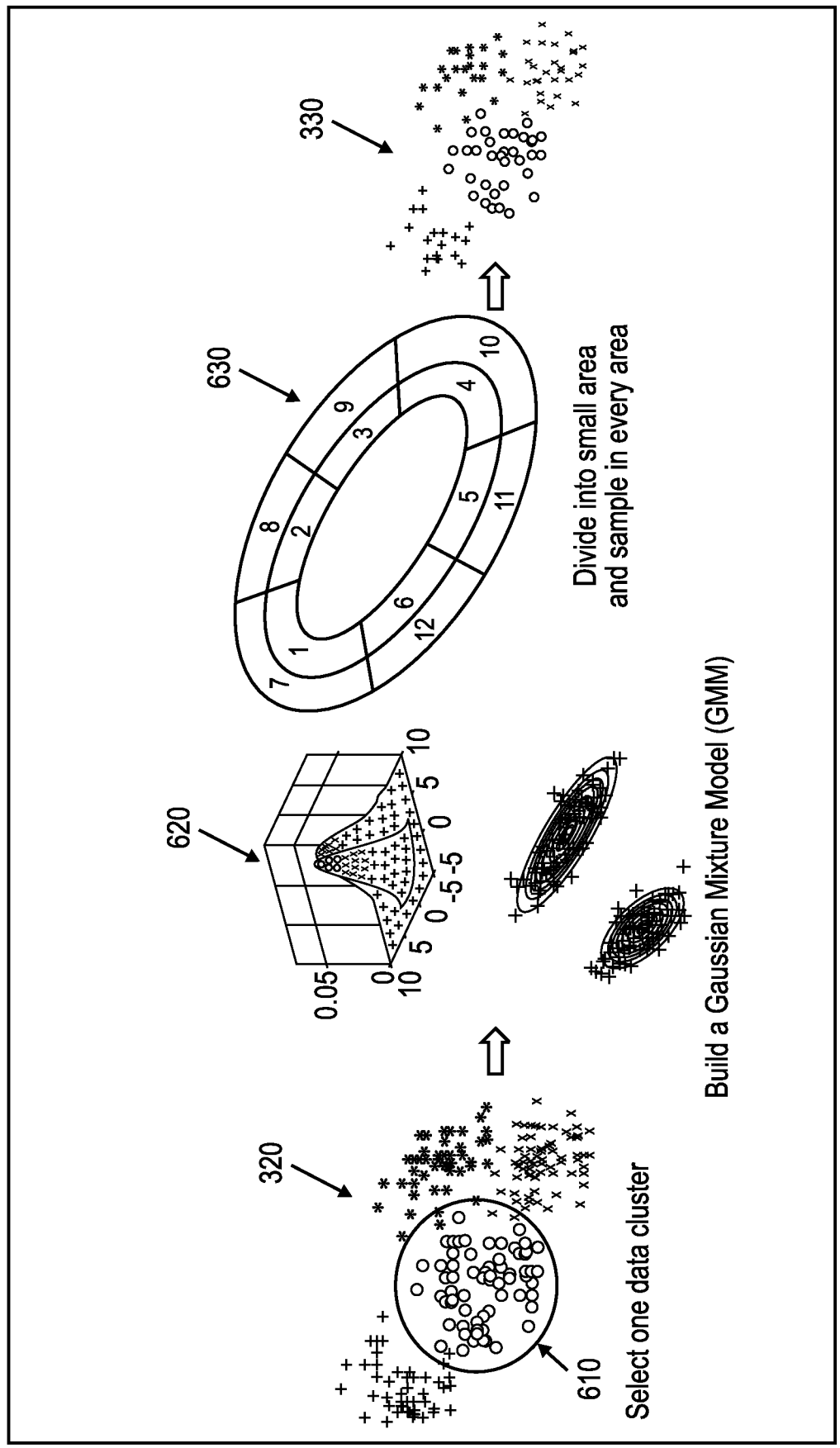
FIG. 6 illustrates sampling in accordance with certain embodiments.

FIG. 6 illustrates sampling in accordance with certain embodiments. Again, the original dataset 310 has been partitioned into N data clusters 320. These N data clusters may be regarded as the data distribution of the original data from the original dataset 310. Since the original dataset is generally large in size, even if the original dataset is divided into different data clusters, the amount of data contained in each data cluster is relatively large, and so it is difficult to quickly compare whether they are affected by focus drift. Therefore, the model corrector 110 enumerates some data from each of these data clusters as representative of the data clusters.

Initially, the model corrector 110 selects one cluster 610 out of the clusters 320. Then, the model corrector 110 uses a Gaussian Mixture Model (GMM) to model the Gaussian distribution for each data cluster (where the data distribution of each data cluster is treated as a mixture of one or more Gaussian distributions, and the purpose of modeling is to fit a Gaussian distribution that may be used as a representation of the data cluster).

The model corrector 110 uses this distribution model to sample the dataset of the data cluster, with the sampling points being uniformly distributed according to the distribution curve. In certain embodiments, the model corrector 110 takes the center of an ellipse 630 as a center of the data of the data cluster, samples uniformly on the long and short axes to get a series of concentric ellipses, divides the area between each two adjacent ellipses into 6 parts, and randomly samples n data in each small area to get the final sampled dataset 330.

Figure 7:
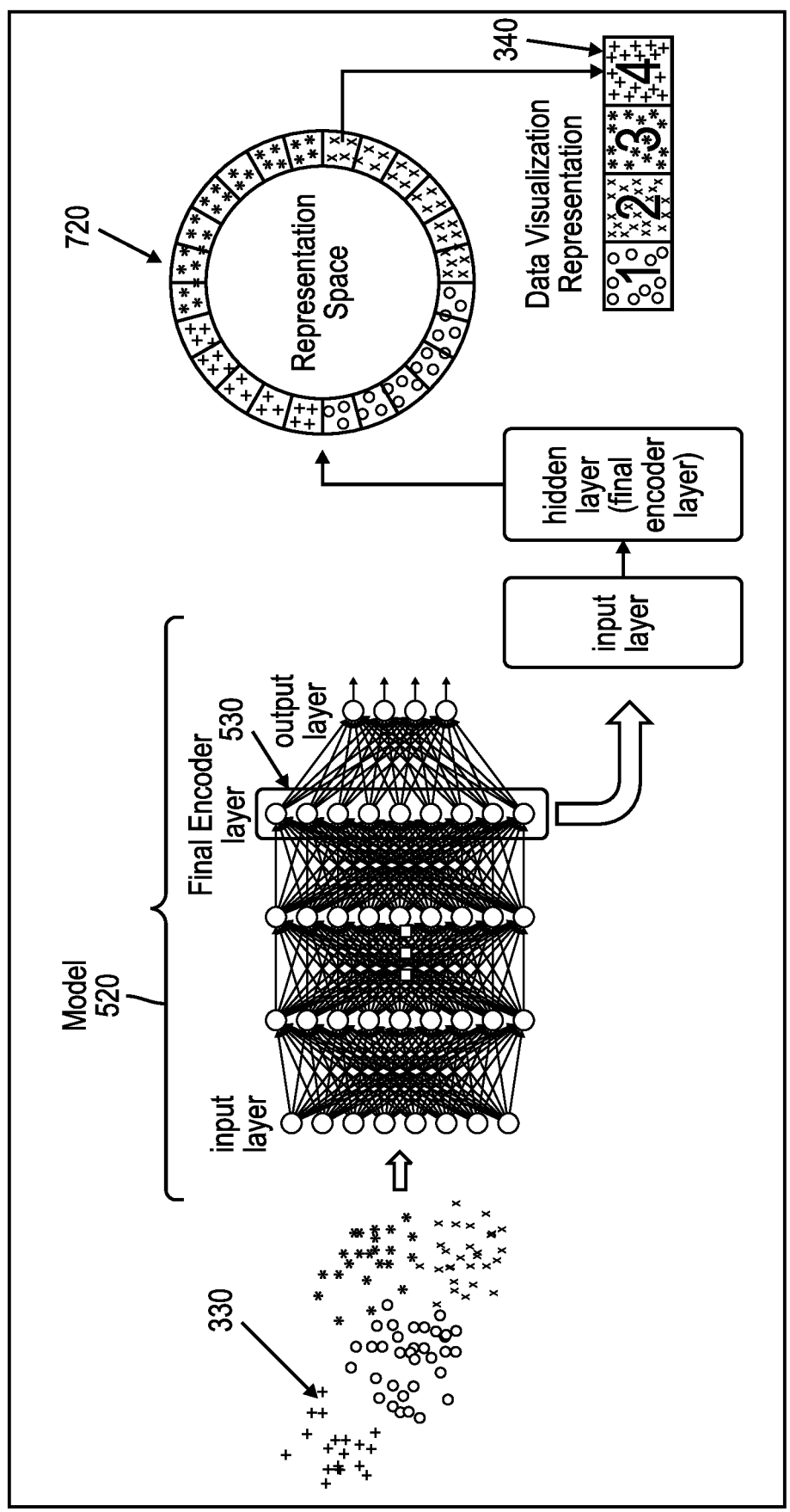
FIG. 7 illustrates creation of a data visualization representation in accordance with certain embodiments.

FIG. 7 illustrates creation of a data visualization representation in accordance with certain embodiments. After sampling N data clusters 330, the model corrector 110 makes an initial visualization anchor for each data cluster sampled. To do this, the model corrector 110 selects N representations from a representation space 720. In embodiments in which the representations are symbols, the representation space 720 is a set of symbols. In embodiments in which the representations are colors, the representation space 720 is a color wheel from the any color space domain with relatively large visual feature differentiation. Examples of the color space domain include: an ICV color model, a Red Green Blue (RGB) color model, a Cyan, Magenta, Yellow (CMY) color model, a Hue Saturation Value (HSV) color model, a Hue Saturation Lightness (HSL) color model, an ICV color model (in which an unsigned integer specifies a color from the color table), etc. The model corrector 110 trains a shallow neural network including an input layer and a hidden layer with the fine-tuning data as the representation vector of a sampled data cluster and the label as the representation. After training, this shallow neural network exists as an encoder, whose role is to project a type of data distribution into a representation (e.g., a symbol or a color). By this operation, it is possible to illustrate the original dataset as a visual representation using N representations (e.g., N colors). These representations may then be used as an initial visual anchors for the original dataset in the data visualization representation 340.

Figure 8:
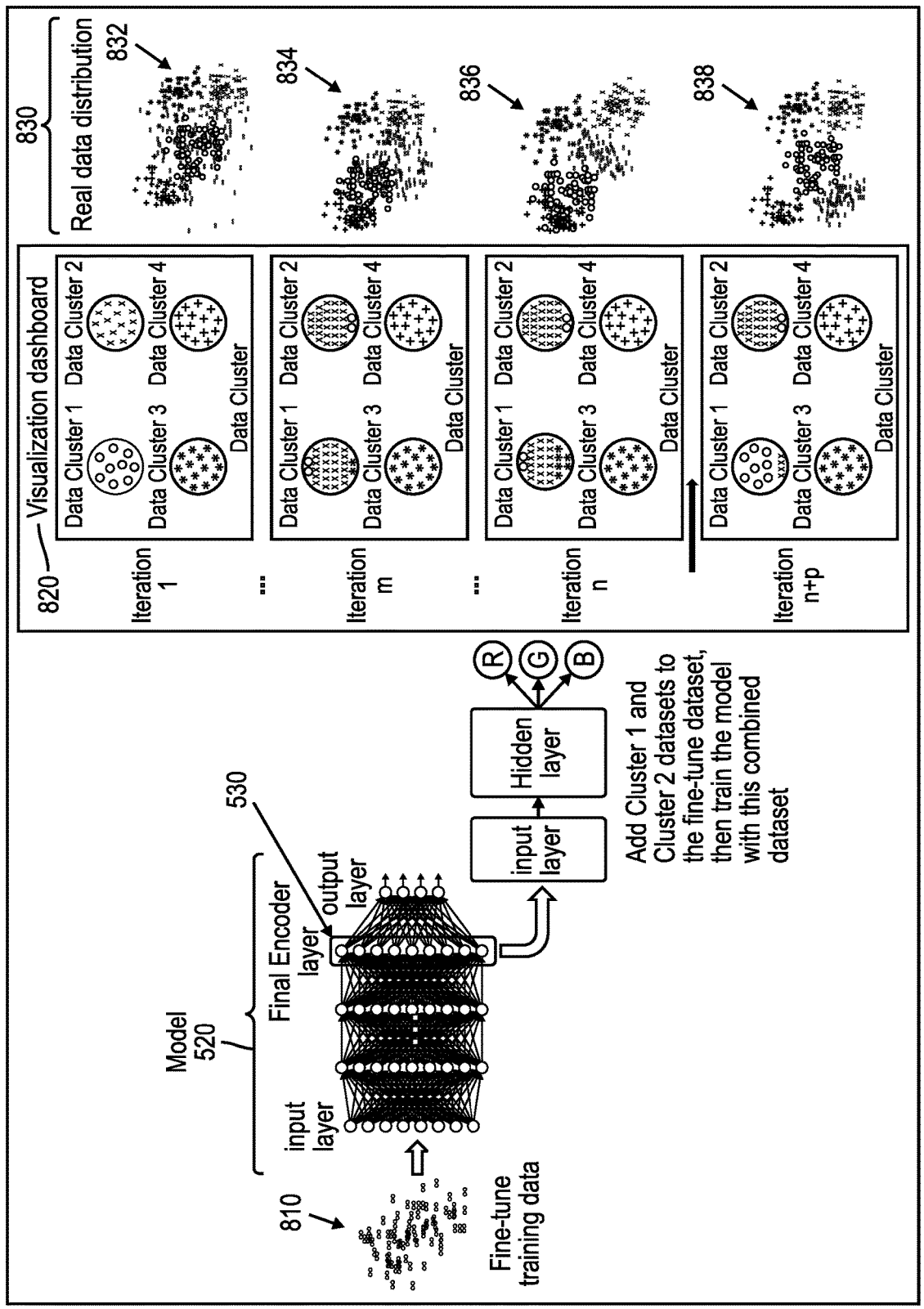
FIG. 8 illustrates a visualization dashboard and data distributions in accordance with certain embodiments.

FIG. 8 illustrates a visualization dashboard 820 and data distributions in accordance with certain embodiments. Once the clusters have been assigned representations, after one fine-tuning iteration and before a next fine-tuning iteration, the model corrector 110 provides a visualization dashboard 340.

In FIG. 8, a new training dataset 810 is used for each iteration of fine-tuning the model. This training dataset includes data represented by the infinity symbol ("∞"). The visualization dashboard 820 includes a visualization for each iteration. In the visualization dashboard 820, for each iteration, the model corrector 110 indicates whether each cluster has focus drift. In this example, the model corrector 110 determines that cluster 1 and cluster 2 have focus drift, and the model corrector 110 uses the dataset for cluster 1, the dataset for cluster 2, and the new fine-tune dataset to fine-tune the model. The real data distribution illustrates data distributions for each iteration. For example, data clusters are distinct (i.e., clear) initially in the data distribution 832. The data clusters of cluster 1 and cluster 2 start to have focus drift (e.g., the clusters are not distinct (i.e., not clear)) in the data distributions 834, 836. Then, the model corrector 110 performs correction, and data cluster 1 and data cluster 2 are distinct (i.e., clear) again in the data distribution 838.

In embodiments in which the representation for each cluster is color, the model corrector 110 uses a palette to represent the fit of the pre-fine-tuned model to the pre-fine-tune dataset. During the fine-tuning process, the model corrector 110 uses the current model to vectorize the previously sampled data after each iteration of training and encodes these vectorized representations into colors via an encoder to update the colors in the palette. If some colors in the palette have changed significantly, the model corrector 110 determines that the data cluster represented by this color has focus drift. Then, in the next iteration of fine-tuning the model, the model corrector 110 adds the data from the impacted clusters (i.e., the color changed data) to the training data for blending so as to correct this model drift.

Figure 9A:
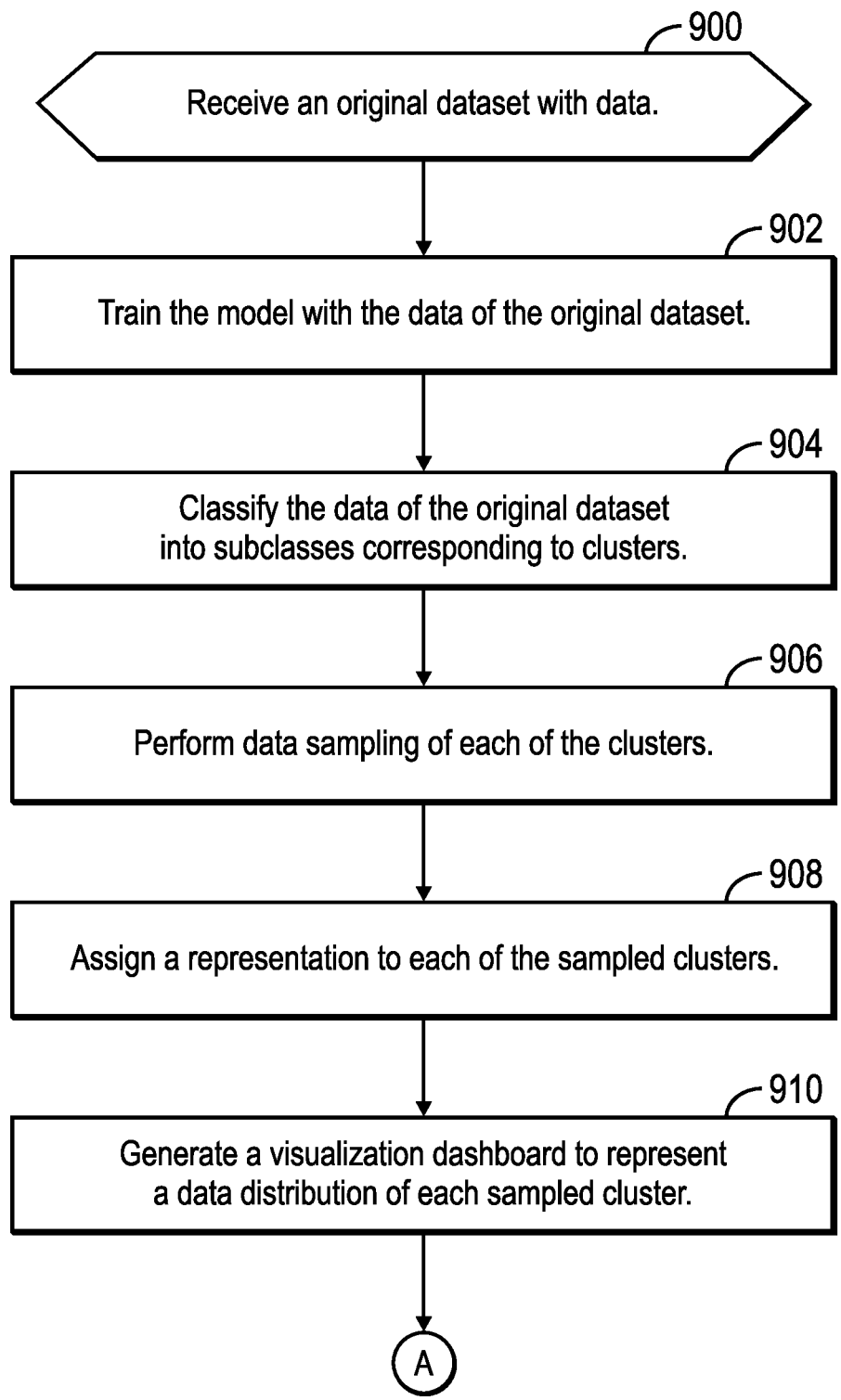
FIGS. 9A, 9B, and 9C illustrate, in a flowchart, operations for identifying and correcting model focus drift during model training in accordance with certain embodiments.
Figure 9B:
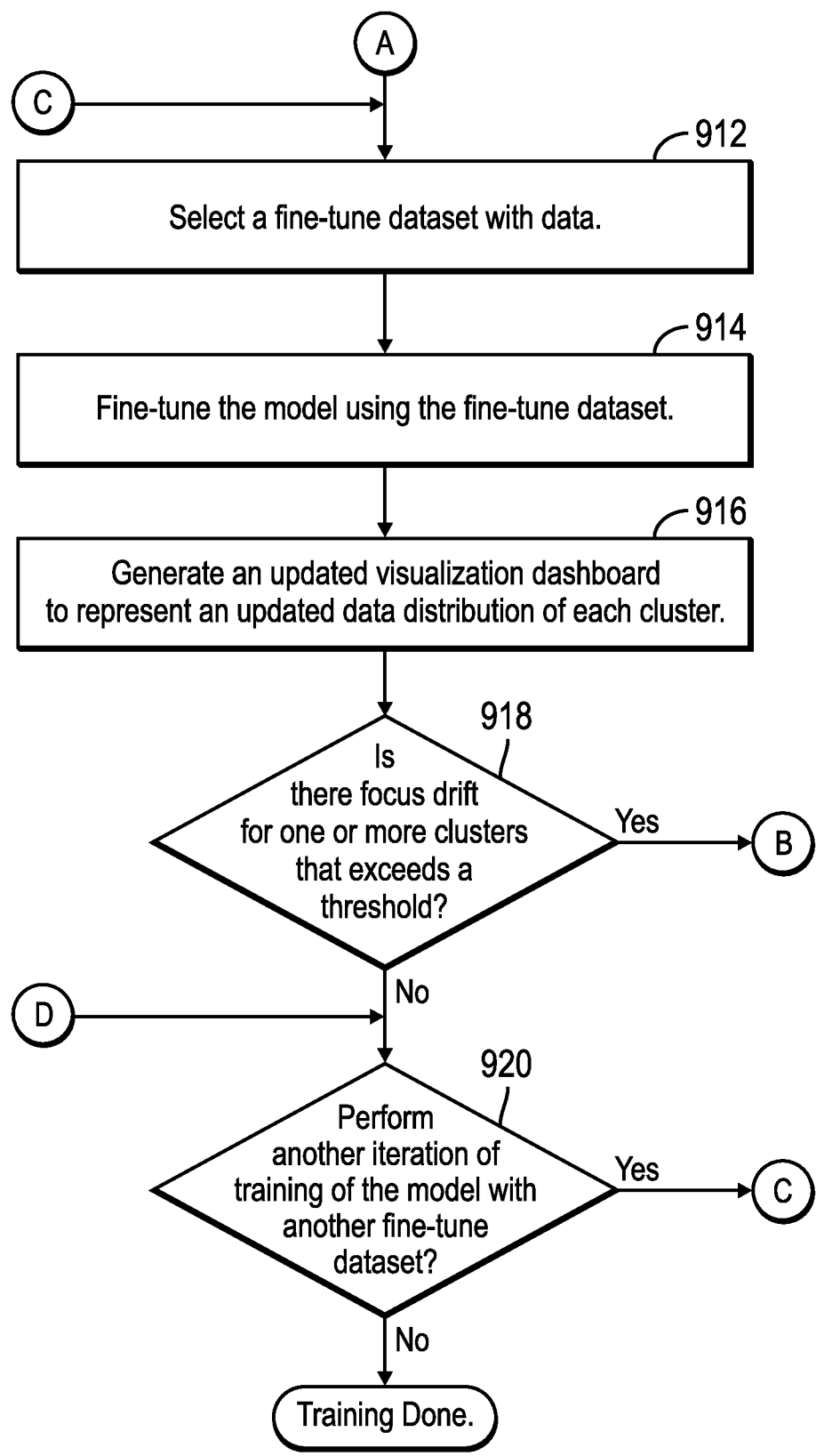
Figure 9C:
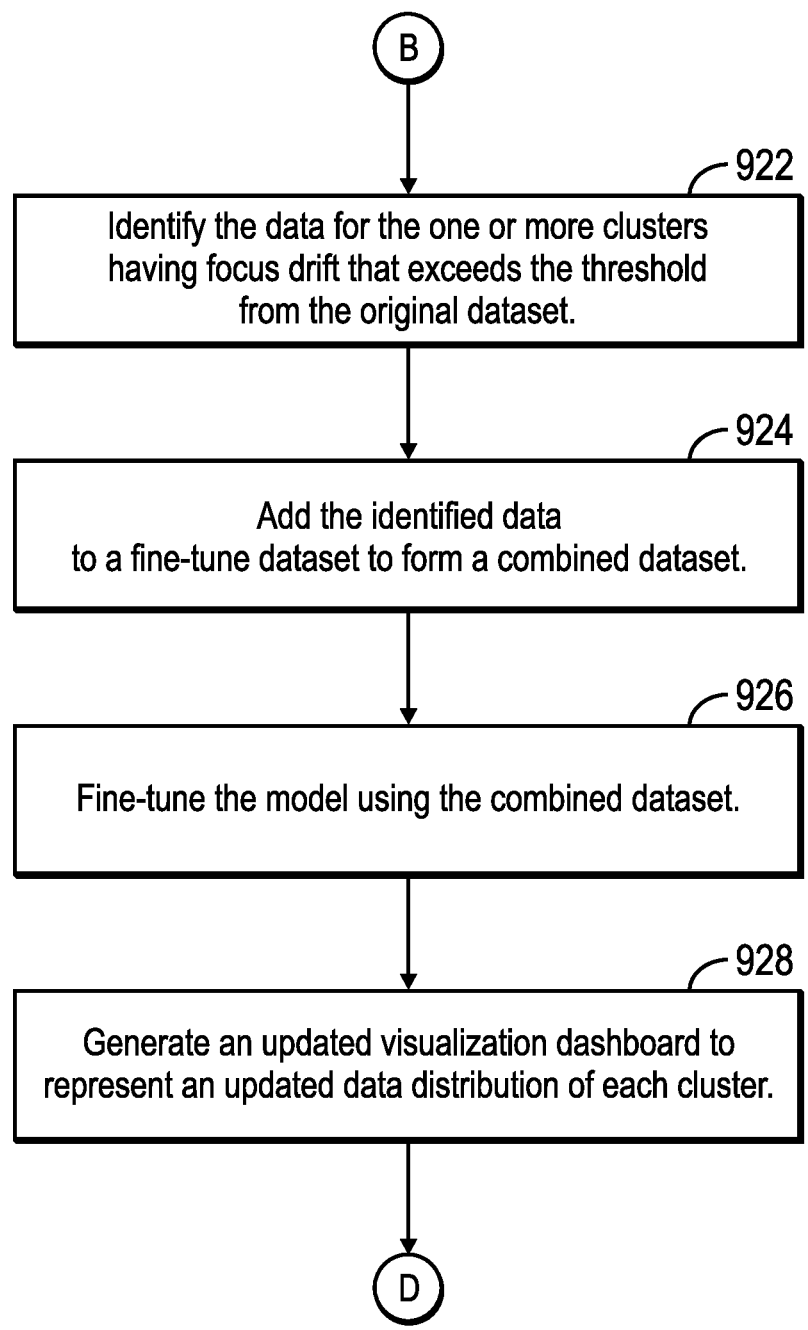

FIGS. 9A, 9B, and 9C illustrate, in a flowchart, operations for identifying and correcting model focus drift during model training in accordance with certain embodiments. Control begins at block 900 with the model corrector 110 receiving an original dataset with data. In block 902, the model corrector 110 trains the model with the data ("original data") of the original dataset. In block 904, the model corrector 110 classifies the data of the original dataset into subclasses corresponding to clusters. Thus, each cluster includes a subset of the original data.

In block 906, the model corrector 110 performs data sampling of each of the clusters. Thus, each sampled cluster includes a subset of the cluster (and is also a subset of the original data).

In block 908, the model corrector 110 assigns a representation to each of the sampled clusters. In block 910, the model corrector 110 generates a visualization dashboard to represent a data distribution of each sampled cluster. From block 910 (FIG. 9A), processing continues to block 912 (FIG. 9B).

In block 912, the model corrector 110 selects a fine-tune dataset with data. In certain embodiments, the fine-tune dataset changes with each iteration of fine-tuning the model. In block 914, the model corrector 110 fine-tunes the model using the fine-tune dataset. That is, the model corrector 110 further trains the model using the fine-tune dataset. In block 916, the model corrector 110 generates an updated visualization dashboard to represent an updated data distribution of each cluster.

In block 918, the model corrector 110 determines whether there is focus drift for one or more clusters that exceeds a threshold. If so, processing continues to block 922 (FIG. 9C), otherwise, processing continues to block 920. The determination of whether there is focus drift includes identifying the one or more clusters having focus drift that exceeds the threshold. In certain embodiments, the model corrector 110 associates a distribution value with each visualization in each visualization dashboard. With embodiments, this distribution value is associated with the data distribution of that cluster. Then, the model corrector 110 determines the difference between the distribution value of the visualization for a cluster in a current visualization dashboard (i.e., a current iteration) and the distribution value of that visualization for the same cluster from the first (original) visualization dashboard (i.e., the first iteration). If the difference exceeds the threshold, the model corrector 110 initiates correction and, optionally, issues a warning (e.g., to a system administrator). That is, if (the distribution value of the visualization from the current iteration—the distribution value of the visualization from the first iteration)>the threshold, then the model corrector initiates correction of the model.

In alternative embodiments, a model maintainer (e.g., a system administrator) may review the virtualization dashboard to visualize the focus drift, compare the color of the visualizations (e.g., circles) in the visualization dashboards, and initiate correction of the model.

In block 920, the model corrector 110 determines whether another iteration of training of the model is to be performed. If so, processing continues to block 912, otherwise, processing ends.

In block 922, the model corrector 110 identifies the data for the one or more clusters having focus drift that exceeds the threshold. In certain embodiments, the data identified for a cluster is the set of sampled data for that cluster. In other embodiments, the data identified for the cluster is the set of data included in that cluster.

In block 924, the model corrector 110 adds the identified data to a fine-tune dataset to form a combined dataset. In block 926, the model corrector 110 fine-tunes the model using the combined dataset. In block 928, the model corrector 110 generates an updated visualization dashboard to represent an updated data distribution of each cluster. From block 928 (FIG. 9C), processing continues to block 920 (FIG. 9B).

Thus, the model corrector 110 provides real-time monitoring of focus drift of the model. The model corrector 110 provides a real-time visualization of the focus drift (i.e., model performance) with fine-tuning iterations by providing the visualization dashboard. The model corrector 110 fixes the focus drift of the model in real time, with each fine-tuning iteration.

Figure 10A:
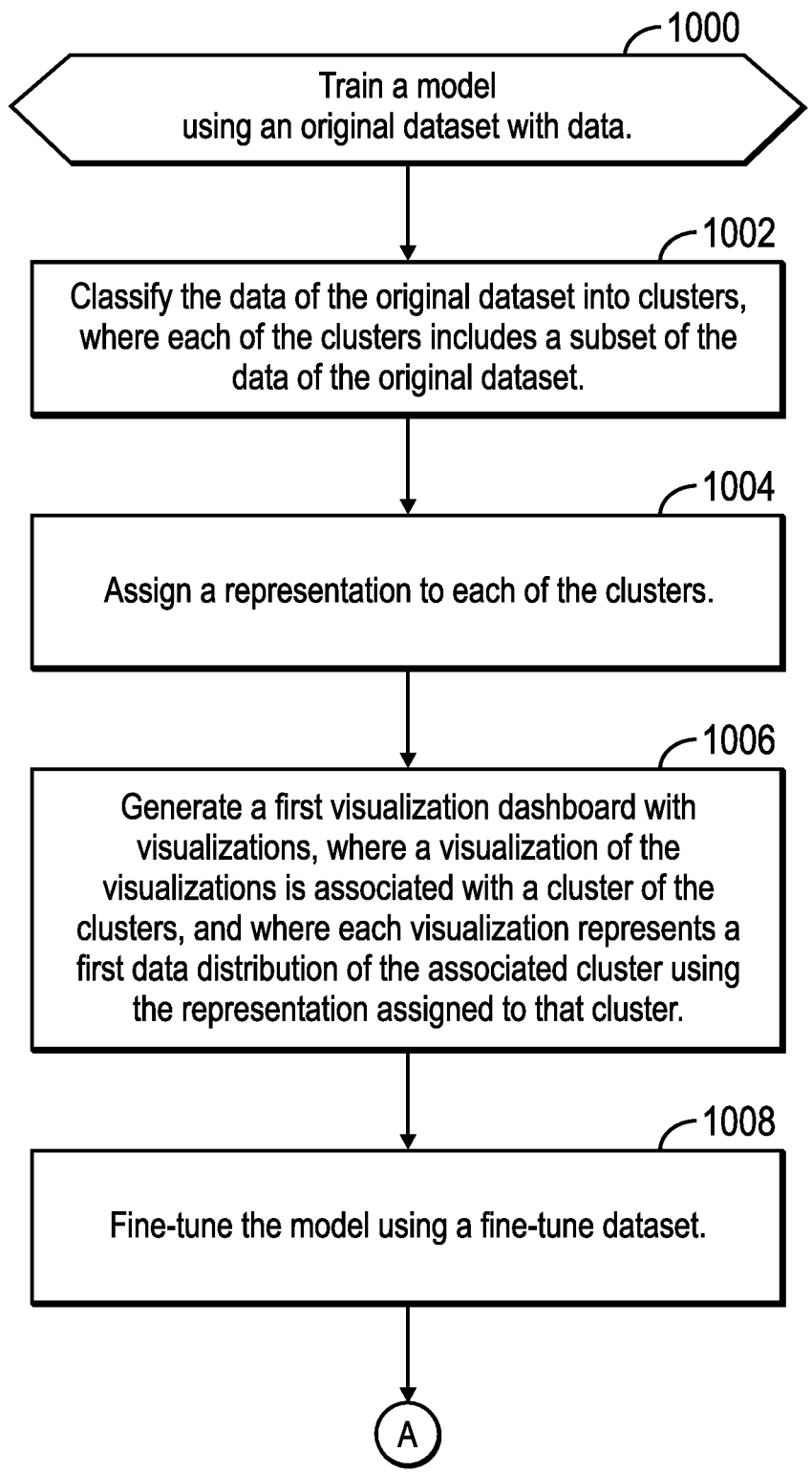
FIGS. 10A and 10B illustrate, in a flowchart, operations for identifying and correcting focus drift for a model in accordance with certain embodiments.
Figure 10B:
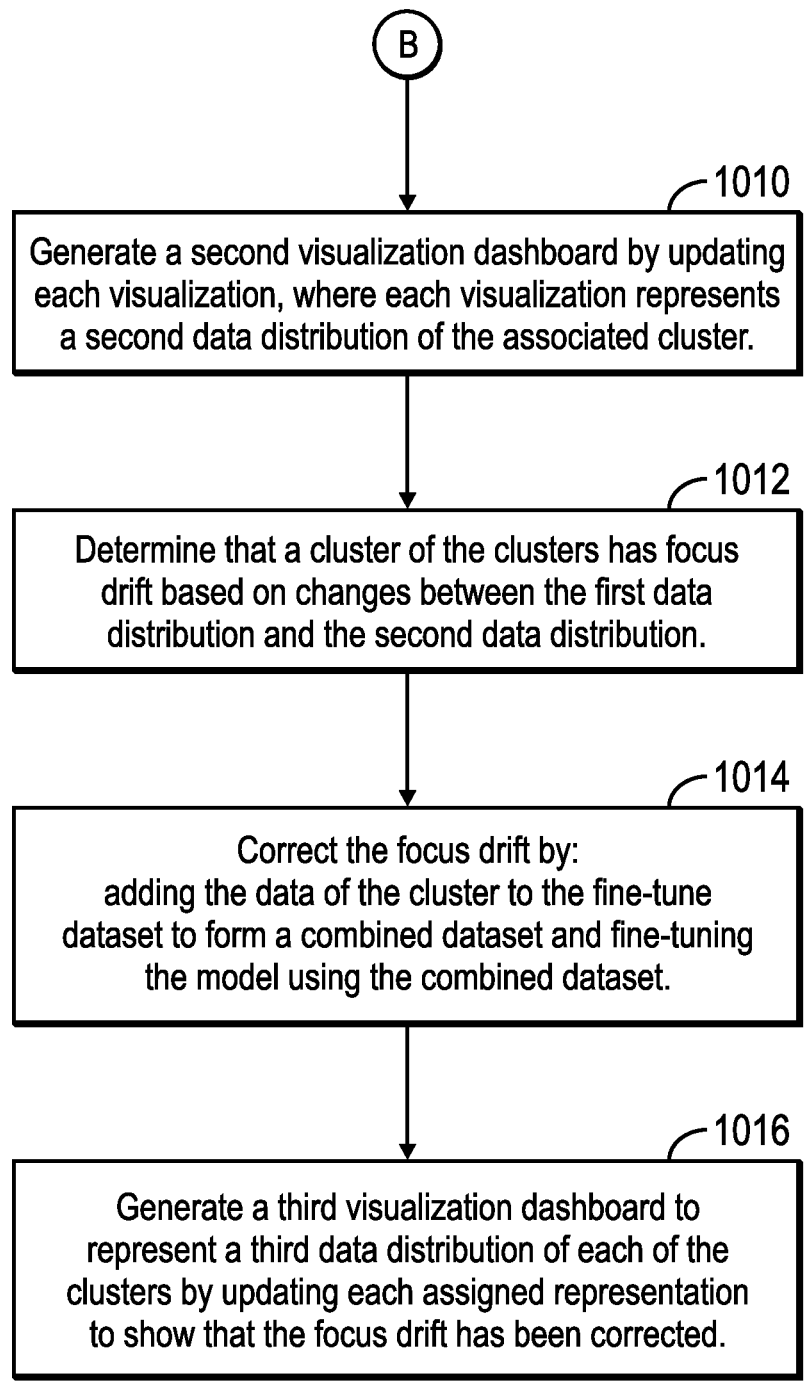

FIGS. 10A and 10B illustrate, in a flowchart, operations for identifying and correcting focus drift for a model in accordance with certain embodiments. Control begins at block 1000 with the model corrector 110 training a model using an original dataset with data. In block 1002, the model corrector 110 classifies the data of the original dataset into clusters, where each of the clusters includes a subset of the data of the original dataset. In certain embodiments, some of the data does not fit into any of the clusters for a particular iteration of training the model.

In block 1004, the model corrector 110 assigns a representation to each of the clusters. In block 1006, the model corrector 110 generates a first visualization dashboard with visualizations, where a visualization of the visualizations is associated with a cluster of the clusters, and where each visualization represents a first data distribution of the associated cluster using the representation assigned to that cluster. The first data distribution may be referred to as the original data distribution or the data distribution after the first iteration or training of the model using the original data. In block 1008, the model corrector 110 fine-tunes the model using a fine-tune dataset. That is, the model corrector 110 further trains the model using the fine-tune dataset. From block 1008 (FIG. 10A), processing continues to block 1010 (FIG. 10B).

In block 1010, the model corrector 110 generates a second visualization dashboard by updating each visualization, where each visualization represents a second data distribution of the associated cluster. In block 1012, the model corrector 110 determines that a cluster of the clusters has focus drift based on changes between the first data distribution and the second data distribution (e.g., based on the difference of the distribution value of the second data distribution and the distribution value of the first data distribution exceeding a threshold). In block 1014, the model corrector 110 corrects the focus drift by: adding the data of the cluster to the fine-tune dataset to form a combined dataset and fine-tuning the model using the combined dataset. In block 1016, the model corrector 110 generates a third visualization dashboard to represent a third data distribution of each of the clusters by updating each assigned representation, and this shows that the focus drift has been corrected.

Figure 11:
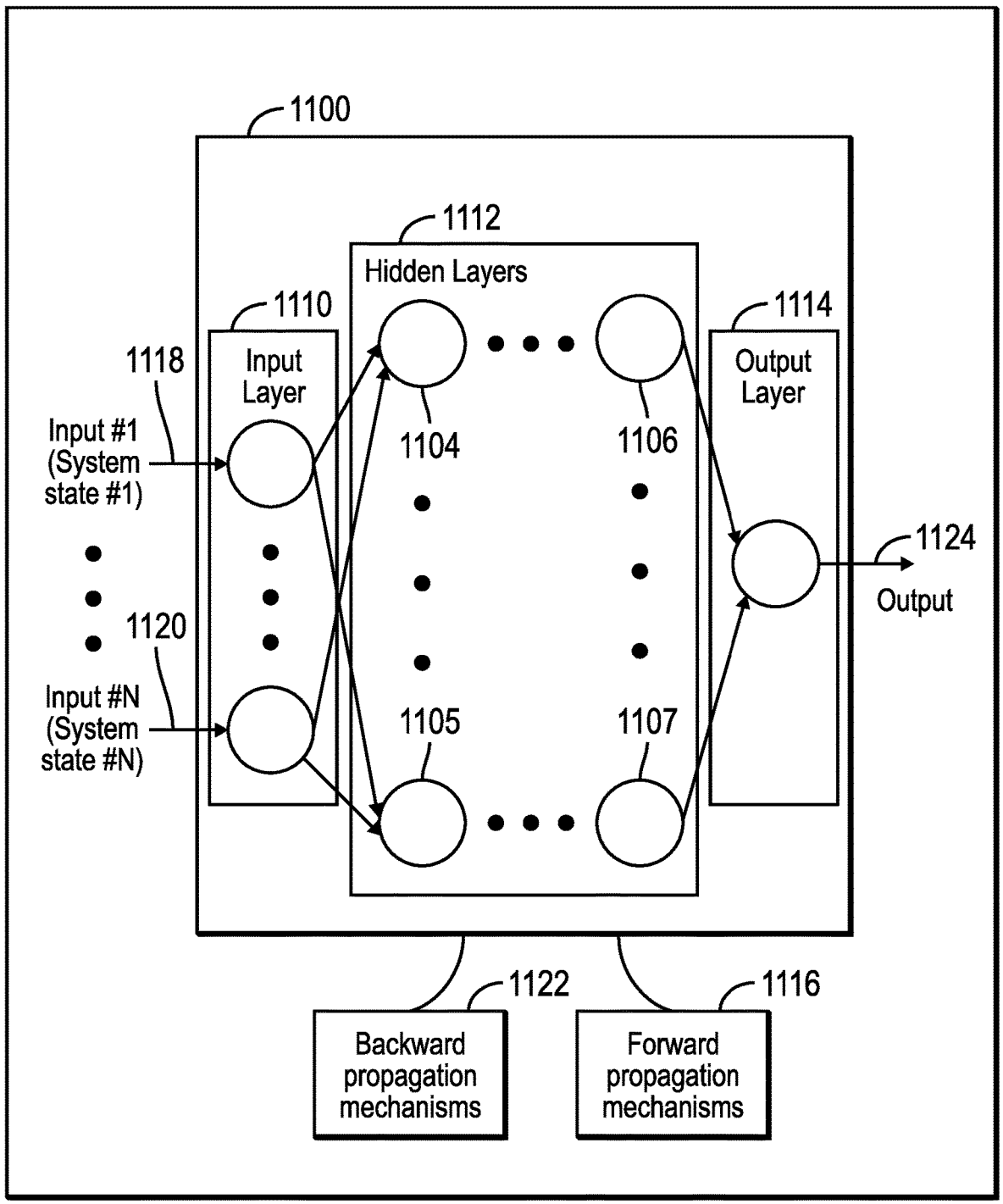
FIG. 11 illustrates, in a block diagram, details of a machine learning model in accordance with certain embodiments.

FIG. 11 illustrates, in a block diagram, details of a machine learning model 1100 in accordance with certain embodiments. In certain embodiments, the one or more models 120 are implemented using the components of the machine learning model 1100.

The machine learning model 1100 may comprise a neural network with a collection of nodes with links connecting them, where the links between the nodes are referred to as connections. For example, FIG. 11 shows a node 1104, a node 1105, a node 1106, and a node 1107, with ellipses indicating other nodes may be between these nodes. The collection of nodes may be organized into three main parts: an input layer 1110, one or more hidden layers 1112, and an output layer 1114.

The connection between one node and another is represented by a number called a weight, where the weight may be either positive (if one node excites another) or negative (if one node suppresses or inhibits another). Training the machine learning model 1100 entails calibrating the weights in the machine learning model 1100 via mechanisms referred to as forward propagation 1116 and backward propagation 1122. Bias nodes that are not connected to any previous layer may also be maintained in the machine learning model 1100. A bias may be described as an extra input of 1 with a weight attached to it for a node.

In forward propagation 1116, a set of weights are applied to the input data 1118 . . . 1120 to calculate the output 1124. For the first forward propagation, the set of weights may be selected randomly or set by, for example, a system administrator. That is, in the forward propagation 1116, embodiments apply a set of weights to the input data 1118 . . . 1120 and calculate an output 1124.

In backward propagation 1122 a measurement is made for a margin of error of the output 1124, and the weights are adjusted to decrease the error. Backward propagation 1122 compares the output that the machine learning model 1100 produces with the output that the machine learning model 1100 was meant to produce, and uses the difference between them to modify the weights of the connections between the nodes of the machine learning model 1100, starting from the output layer 1114 through the hidden layers 1112 to the input layer 1110, i.e., going backward in the machine learning model 1100. In time, backward propagation 1122 causes the machine learning model 1100 to learn, reducing the difference between actual and intended output to the point where the two come very close or coincide.

The machine learning model 1100 may be trained using backward propagation to adjust weights at nodes in a hidden layer to produce adjusted output values based on the provided inputs 1118 . . . 1120. A margin of error may be determined with respect to the actual output 1124 from the machine learning model 1100 and an expected output to train the machine learning model 1100 to produce the desired output value based on a calculated expected output. In backward propagation, the margin of error of the output may be measured and the weights at nodes in the hidden layers 1112 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 1100 is configured to repeat both forward and backward propagation until the weights of the machine learning model 1100 are calibrated to accurately predict an output.

The machine learning model 1100 implements a machine learning technique such as decision tree learning, association rule learning, artificial neural network, inductive programming logic, support vector machines, Bayesian models, etc., to determine the output value 1124.

In certain machine learning model 1100 implementations, weights in a hidden layer of nodes may be assigned to these inputs to indicate their predictive quality in relation to other of the inputs based on training to reach the output value 1124.

With embodiments, the machine learning model 1100 is a neural network, which may be described as a collection of "neurons" with "synapses" connecting them.

With embodiments, there may be multiple hidden layers 1112, with the term "deep" learning implying multiple hidden layers. Hidden layers 1112 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1116 and the backward propagation 1122.

In backward propagation 1122, embodiments measure the margin of error of the output and adjust the weights accordingly to decrease the error.

Neural networks repeat both forward and backward propagation until the weights are calibrated to accurately predict the output 1124.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 12:
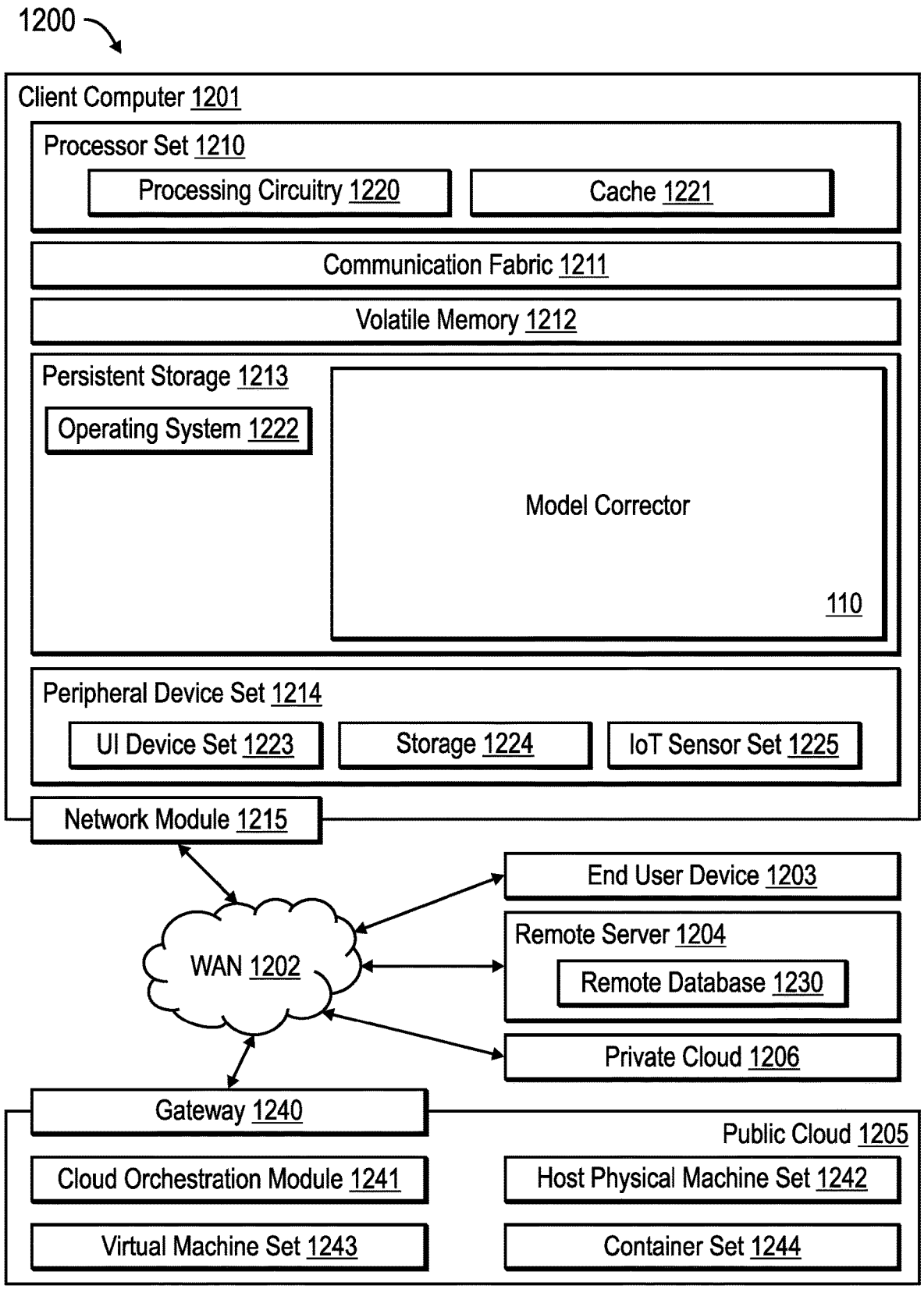
FIG. 12 illustrates a computing environment in accordance with certain embodiments.

FIG. 12 illustrates a computing environment 1200 in accordance with certain embodiments. Computing environment 1200 contains an example of an environment for the execution of at least some of the computer code involved in performing the inventive methods, such as a model corrector 110. In addition to block 110, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 110, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 110 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface-type operating systems that employ a kernel. The code included in block 110 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The terms "an embodiment". "embodiment", "embodiments", "the embodiment". "the embodiments". "one or more embodiments". "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    training a model using an original dataset with data;
    classifying the data of the original dataset into clusters;
    generating a first visualization dashboard with visualizations, wherein each visualization represents a first data distribution of an associated cluster of the clusters;
    assigning a first distribution value to the first data distribution of a particular cluster of the clusters;
    fine-tuning the model using a fine-tune dataset;
    generating a second visualization dashboard by updating each visualization, wherein each visualization represents a second data distribution of the associated cluster;
    assigning a second distribution value to the second data distribution of the particular cluster;
    determining that the particular cluster has focus drift that exceeds a threshold based on a difference between the second distribution value and the first distribution value exceeding the threshold, wherein the difference indicates that the second data distribution of the particular cluster is not distinct from one or more data distributions of other clusters based on the threshold;
    identifying a subset of data from the data of the original dataset for the particular cluster;
    combining the subset of the data from the original dataset with the fine-tune dataset to form a combined dataset;
    correcting the focus drift by fine-tuning the model using the combined dataset; and
    determining that the corrected focus drift for the particular cluster does not exceed the threshold.

2. The computer-implemented method of claim 1, further comprising operations for:
    generating sampled clusters by selecting sample data from each of the clusters.

3. The computer-implemented method of claim 1, further comprising operations for:
    training an encoder to identify a new representation for a new cluster, wherein the new representation is used to represent the new cluster in a new visualization dashboard.

4. The computer-implemented method of claim 1, further comprising operations for:
    assigning a representation to a cluster of the clusters, wherein the representation comprises at least one of a symbol and a color.

5. The computer-implemented method of claim 1, further comprising operations for:
- determining that a plurality of clusters of the clusters has focus drift; and
- correcting the focus drift by:
  - adding the data of each cluster of the plurality of clusters to the fine-tune dataset to form a new combined dataset; and
  - fine-tuning the model using the new combined dataset.

6. The computer-implemented method of claim 1, further comprising operations for:
- in response to each fine-tuning iteration of a plurality of fine-tuning iterations,
  - determining whether each of the clusters has focus drift; and
  - in response to determining that at least one of the clusters has focus drift, correcting the focus drift.

7. A computer program product, the computer program product comprising a computer readable storage medium having program code embodied therewith, the program code executable by at least one processor to perform operations for:
- training a model using an original dataset with data;
- classifying the data of the original dataset into clusters;
- generating a first visualization dashboard with visualizations, wherein each visualization represents a first data distribution of an associated cluster of the clusters;
- assigning a first distribution value to the first data distribution of a particular cluster of the clusters;
- fine-tuning the model using a fine-tune dataset;
- generating a second visualization dashboard by updating each visualization, wherein each visualization represents a second data distribution of the associated cluster;
- assigning a second distribution value to the second data distribution of the particular cluster;
- determining that the particular cluster has focus drift that exceeds a threshold based on a difference between the second distribution value and the first distribution value exceeding the threshold, wherein the difference indicates that the second data distribution of the particular cluster is not distinct from one or more data distributions of other clusters based on the threshold;
- identifying a subset of data from the data of the original dataset for the particular cluster;
- combining the subset of the data from the original dataset with the fine-tune dataset to form a combined dataset;
- correcting the focus drift by fine-tuning the model using the combined dataset; and
- determining that the corrected focus drift for the particular cluster does not exceed the threshold.

8. The computer program product of claim 7, wherein the program code is executable by the at least one processor to perform further operations for:
- generating sampled clusters by selecting sample data from each of the clusters.

9. The computer program product of claim 7, wherein the program code is executable by the at least one processor to perform further operations for:
- training an encoder to identify a new representation for a new cluster, wherein the new representation is used to represent the new cluster in a new visualization dashboard.

10. The computer program product of claim 7, wherein the program code is executable by the at least one processor to perform further operations for:
- assigning a representation to a cluster of the clusters, wherein the representation comprises at least one of a symbol and a color.

11. The computer program product of claim 7, wherein the program code is executable by the at least one processor to perform further operations for:
- determining that a plurality of clusters of the clusters has focus drift; and
- correcting the focus drift by:
  - adding the data of each cluster of the plurality of clusters to the fine-tune dataset to form a new combined dataset; and
  - fine-tuning the model using the new combined dataset.

12. The computer program product of claim 7, wherein the program code is executable by the at least one processor to perform further operations for:
- in response to each fine-tuning iteration of a plurality of fine-tuning iterations,
  - determining whether each of the clusters has focus drift; and
  - in response to determining that at least one of the clusters has focus drift, correcting the focus drift.

13. A computer system, comprising:
- one or more processors, one or more computer-readable memories and one or more computer-readable, tangible storage devices; and
- program instructions, stored on at least one of the one or more computer-readable, tangible storage devices for execution by at least one of the one or more processors via at least one of the one or more computer-readable memories, to perform operations comprising:
- training a model using an original dataset with data;
- classifying the data of the original dataset into clusters;
- generating a first visualization dashboard with visualizations, wherein each visualization represents a first data distribution of an associated cluster of the clusters;
- assigning a first distribution value to the first data distribution of a particular cluster of the clusters;
- fine-tuning the model using a fine-tune dataset;
- generating a second visualization dashboard by updating each visualization, wherein each visualization represents a second data distribution of the associated cluster;
- assigning a second distribution value to the second data distribution of the particular cluster;
- determining that the particular cluster has focus drift that exceeds a threshold based on a difference between the second distribution value and the first distribution value exceeding the threshold, wherein the difference indicates that the second data distribution of the particular cluster is not distinct from one or more data distributions of other clusters based on the threshold;
- identifying a subset of data from the data of the original dataset for the particular cluster;
- combining the subset of the data from the original dataset with the fine-tune dataset to form a combined dataset;
- correcting the focus drift by fine-tuning the model using the combined dataset; and
- determining that the corrected focus drift for the particular cluster does not exceed the threshold.

14. The computer system of claim 13, wherein the operations further comprise:
- generating sampled clusters by selecting sample data from each of the clusters.

15. The computer system of claim 13, wherein the operations further comprise:

training an encoder to identify a new representation for a new cluster, wherein the new representation is used to represent the new cluster in a new visualization dashboard.

16. The computer system of claim 13, wherein the operations further comprise:
assigning a representation to a cluster of the clusters, wherein the representation comprises at least one of a symbol and a color.

17. The computer system of claim 13, wherein the operations further comprise:
determining that a plurality of clusters of the clusters has focus drift; and
correcting the focus drift by:
adding the data of each cluster of the plurality of clusters to the fine-tune dataset to form a new combined dataset; and
fine-tuning the model using the new combined dataset.

18. The computer-implemented method of claim 1, wherein the fine-tune dataset comprises new data, and wherein the clusters comprise a new cluster for the new data.

19. The computer program product of claim 7, wherein the fine-tune dataset comprises new data, and wherein the clusters comprise a new cluster for the new data.

20. The computer system of claim 13, wherein the fine-tune dataset comprises new data, and wherein the clusters comprise a new cluster for the new data.

* * * * *